March 13, 1962 A. E. LORENZ 3,025,065

DRIVE TRANSMITTING MEANS

Original Filed Feb. 8, 1954

7 Sheets-Sheet 1

INVENTOR.
Alfred E. Lorenz
BY Horton, Davis,
Brewer & Brugman
Atty.

March 13, 1962 A. E. LORENZ 3,025,065

DRIVE TRANSMITTING MEANS

Original Filed Feb. 8, 1954

7 Sheets-Sheet 2

INVENTOR.
Alfred E. Lorenz
BY Horton, Davis, Brewer + Brugman
Atty.

March 13, 1962 A. E. LORENZ 3,025,065

DRIVE TRANSMITTING MEANS

Original Filed Feb. 8, 1954 7 Sheets-Sheet 3

INVENTOR.

Alfred E. Lorenz

BY Horton, Davis, Brewer + Brugman

Att'y.

March 13, 1962

A. E. LORENZ 3,025,065

DRIVE TRANSMITTING MEANS

Original Filed Feb. 8, 1954

7 Sheets-Sheet 4

INVENTOR.
Alfred E. Lorenz
BY Horton, Davis, Brewer & Brugman
Atty.

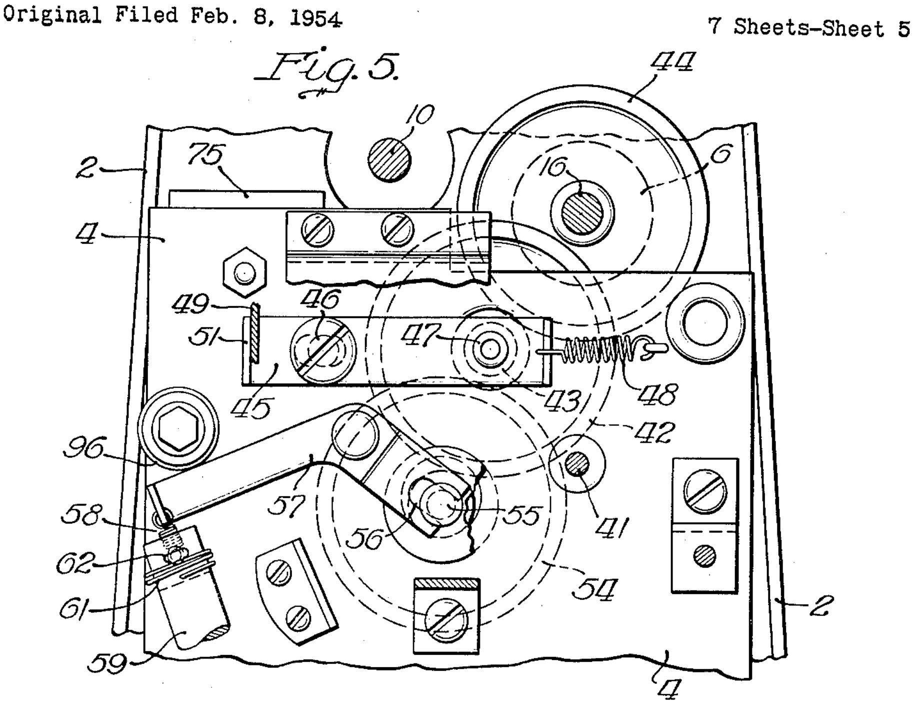
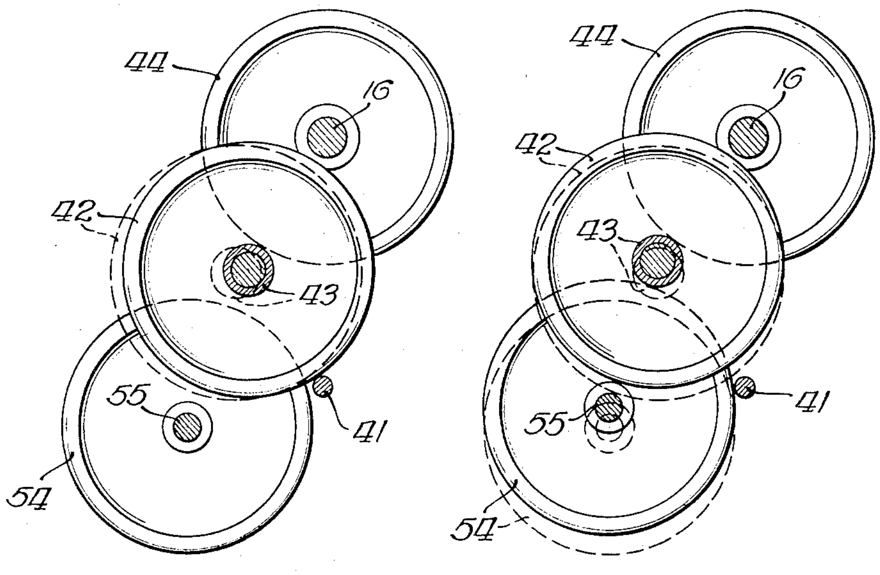
Fig. 5. Fig. 9. Fig. 10.
INVENTOR
Alfred E. Lorenz
BY Horton, Davis,
Brewer + Brugman
Atty.

March 13, 1962 A. E. LORENZ 3,025,065

DRIVE TRANSMITTING MEANS

Original Filed Feb. 8, 1954 7 Sheets-Sheet 6

INVENTOR.
Alfred E. Lorenz
BY Horton, Davis, Brewer & Brugman
Atty.

DRIVE TRANSMITTING MEANS

Original Filed Feb. 8, 1954

7 Sheets-Sheet 7

INVENTOR.
Alfred E. Lorenz
BY Horton, Davis, Brewer & Brugman
Att'y.

United States Patent Office 3,025,065

Patented Mar. 13, 1962

3,025,065

DRIVE TRANSMITTING MEANS

Alfred E. Lorenz, Algonquin, Ill., assignor, by mesne assignments, to Victor Comptometer Corporation, Chicago, Ill., a corporation of Illinois Original application Feb. 8, 1954, Ser. No. 408,907. Divided and this application June 18, 1957, Ser. No. 666,387

11 Claims. (Cl. 274—4)

This invention pertains to improvements in transducing apparatus, systems and methods. More specifically stated this invention pertains, among other things, to improvements in magnetic recording and reproducing apparatus, systems and methods, wherein magnetic signals may be recorded and reproduced by magnetic flux interlinkage between relatively moving magnetic elements of a magnetic recording medium and windings of a magnetic transducer head which may be used as desired either for recording or for reproducing the signals.

The present application is a division of my co-pending United States Letters Patent application, Serial Number 408,907, filed February 8, 1954, and for so much of the subject matter disclosed herein which is also disclosed in said co-pending application, I claim the priority of said co-pending, and parent, application.

This invention also pertains to improvements in apparatus for driving or moving magnetic recording medium, such as for example, a belt formed of suitably coated plastic material, in a forward or rearward direction as desired, while simultaneously and automatically moving the transducer head laterally with respect to the movement of the magnetic recording medium.

For the purpose of illustration, the present invention will be described with respect to an embodiment thereof in what may be referred to as an endless belt type of magnetic recorder and reproducer well adapted for use in dictating and transcribing procedures.

In the devices of the general type contemplated by this invention it is desirable for the operators to be able to drive the belt containing the magnetic recording material either forwardly or reversely.

It is therefore one of the primary objectives of this invention to provide, in a device of the type contemplated, improvements in a drive unit for an endless flexible belt type of magnetic recording medium, in which device the endless belt may be driven forwardly or reversely while simultaneously moving the magnetic record transducer head laterally with respect to the relatively moving belt and while maintaining the transducer head accurately aligned with a predetermined helical path of recorded magnetic signals upon the belt.

An additional objective is to provide in a device of the foregoing character, drive transmitting means including means for reversing the direction of the drive of the member driven thereby, in which such reversal of drive can be made in a simple and easy manner.

The foregoing and other objectives, important novel features and advantages of this invention, will become more apparent and more easily understood upon an examination of the following description of an example of an embodiment of the invention, the accompanying drawings and appended claims. It should be understood that without desire of limitation, the preferred embodiment of this invention will be described and illustrated as improvements pertaining to the endless magnetic belt type of recording and reproducing apparatus. Certain changes and variations may suggest themselves to those skilled in the pertinent arts, which changes may not, however, depart from the spirit of this invention and may come within the scope of the appended claims.

In the accompanying drawings:

FIGURE 5 is an elevational view illustrating the neutral arrangement of slide plates and linkages used for supporting and moving into operative position certain motion transmission friction wheels in the improved drive arrangement for the magnetic belt;

FIGURE 9 is a schematic illustration of the arrangement of the friction wheels of the drive mechanism of the improved device when arranged for forward drive motion;

FIGURE 10 is a schematic illustration similar to FIGURE 9 of the drawings, showing the friction wheels arranged for reverse driving.

Figure 1:
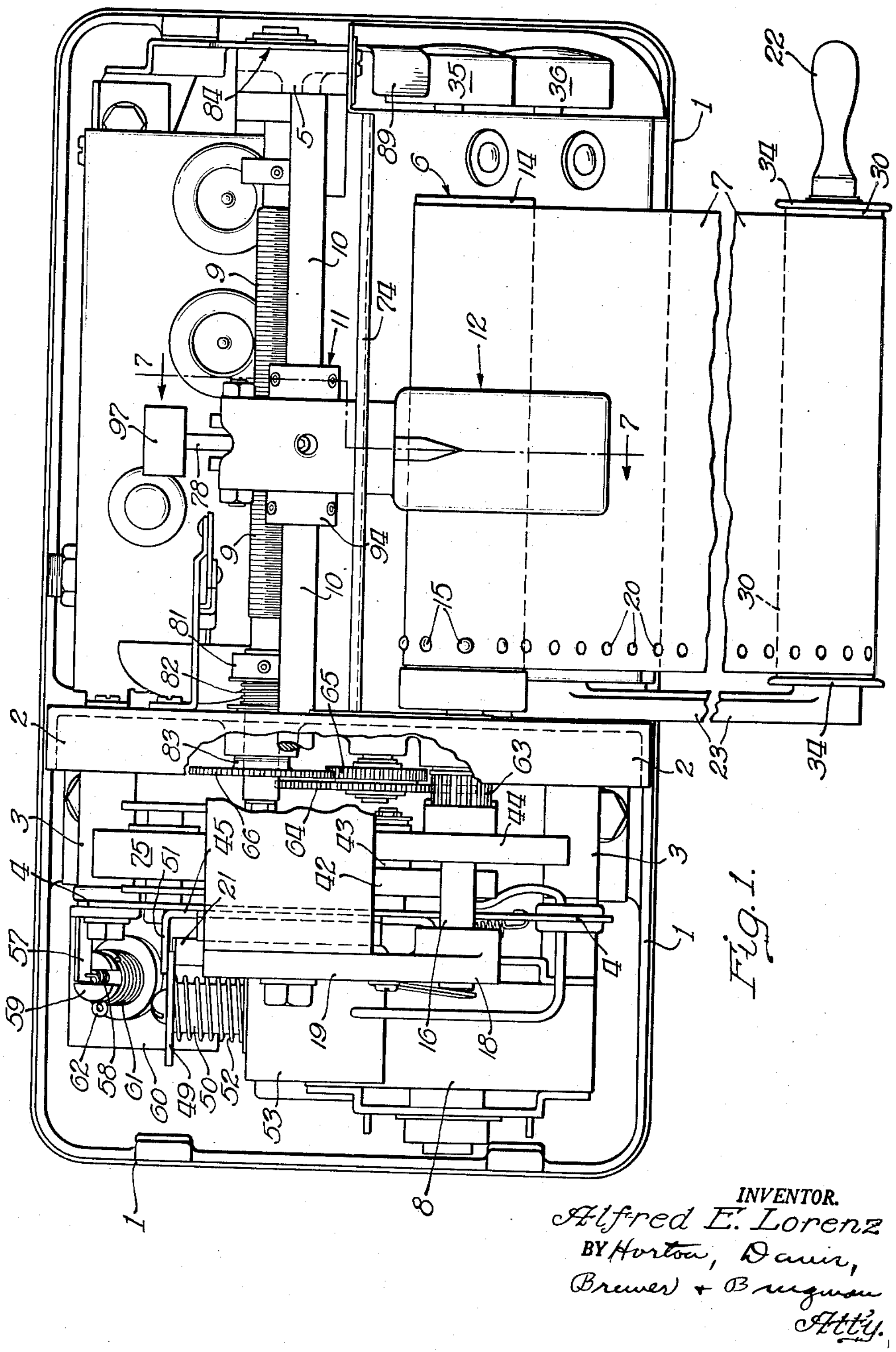
FIGURE 1 is a plan view of the improved apparatus with the casing of the apparatus partially removed and the magnetic belt in operative position.
Figure 2:
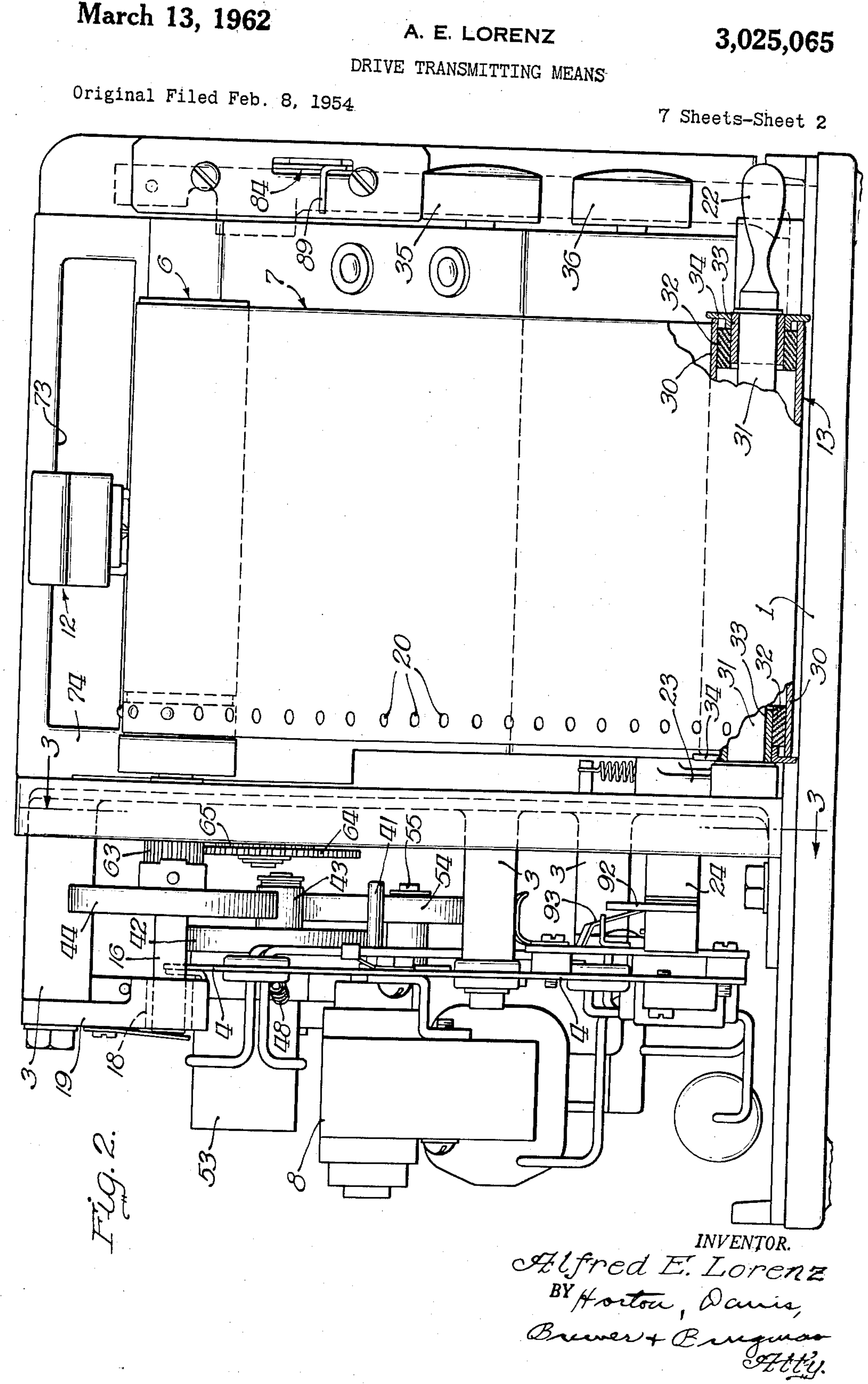
FIGURE 2 is a front elevational view, partially in broken away section, of the device shown in FIGURE 1 of the drawings.

Referring to the drawings, in which like numerals are used to identify like elements of the illustrated embodiment of the invention and referring first to FIGURES 1 and 2 of the drawings, 1 represents generally a horizontal base for the improved apparatus, having a transverse vertically extending frame element 2 suitably secured thereto to one side of the transverse mid-portion of the base.

A series of studs or bracket elements 3 extend longitudinally of the base 1 from the left hand side of the vertical frame element 2. A panel element 4 is secured to the ends of some of the stud or bracket elements 3, and is supported in parallel arrangement with the vertical frame element 2. Extending vertically from the right hand end of the horizontal base 1 as viewed in FIGURES 1 and 2 of the drawings, is a frame element 5 which is parallel to the frame element 2.

The combination of the base 1, vertical frame elements 2 and 5, panel 4, and studs or brackets 3, are utilized generally to support a drive roll 6 for a magnetic belt 7; a power unit 8 for driving the drive roll 6; and a transducer head lead screw 9 as well as a carriage support or guide rod 10 upon which the carriage 11 for the transducer head 12 is reciprocally supported with respect to the belt 7 drawn tight over the drive roll 6 by a belt tightener 13 pivotally supported upon the vertical frame 2.

In the preferred embodiment of the invention as viewed in FIGURES 1 and 2 of the drawings, the drive roll 6, which is supported only at its left hand end, includes a rubber sheath or outer layer 14 for engaging and drivingly supporting the belt 7. Endwise as well as circumferential slippage of the belt 7 on the drive roll 6 is prevented by the provision of a circumferential row of sprocket like, substantially semispherical, projections 15 extending outwardly from the periphery of the roll 6, near the supported end thereof. The projections 15 become engaged in the spaced and aligned series of apertures in the adjacent marginal portion of the belt 7. The roll 6 is rotatably supported parallel to the base 1 and perpendicular to the frame element 2 by the extension of the drive roll shaft 16 through spaced journals or bearings 17 and 18 positioned respectively in the vertical frame 2 and in the bracket arm 19 extending from the end of one of the upper studs 3, thus giving the roll 6 a substantially rigid two point support and permitting the roll 6 to extend to the right of the journal 17 free of support arrangements.

In preparation for the operation of the improved device as viewed in FIGURES 1 and 2 of the drawings, the loop of the magnetic belt 7 is slipped over the free right hand end of the drive roll 6 and over the corresponding end of the belt tightener 13. The belt tightener 13 for this purpose should be moved from the uppermost retracted position shown in dotted lines in FIGURE 6 of the drawings to the intermediate position also shown in dotted lines in the same drawing. With the belt tightener 13 and drive roll 6 in those relative positions as just described the loop of the belt 7 is slipped over the right hand ends of the roll 6 and tightener 13 to such an extent that the perforations 20 in belt 7 are aligned with the circumferential row of substantially semispherical sprocket-like projections 15 at the left hand end of the drive roll 6 with the perforations 20 laced over adjacent projections 15. The belt 7 having been arranged in that position, the belt tightener 13 may, by grasping the handle 22 be pivoted into the belt tightening position illustrated in full lines in FIGURE 6 of the drawings, by swinging the tightener outwardly and downwardly on the arm 23 which is pivoted on shaft 24 to the vertical frame 2.

Figures 6, 7:
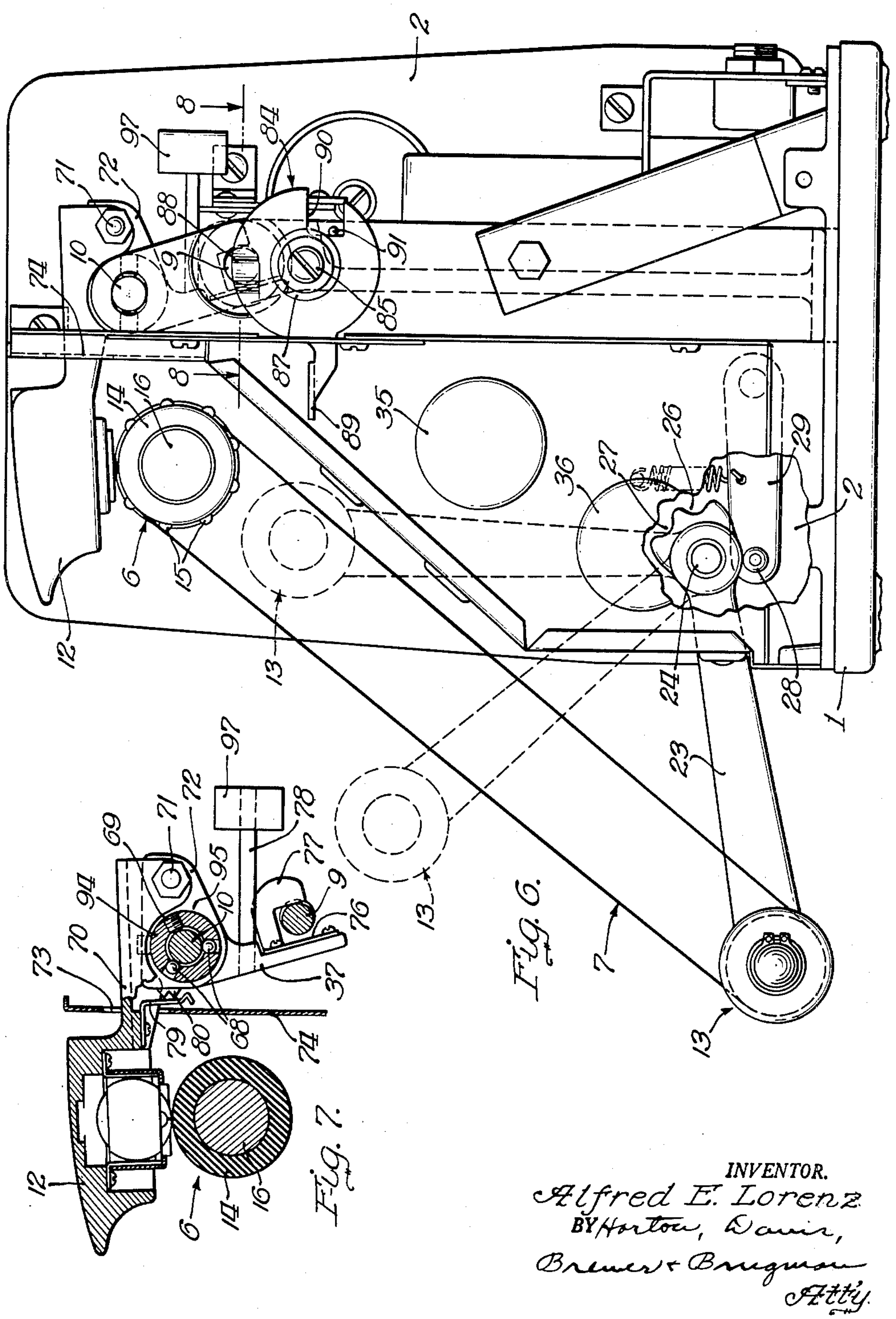
FIGURE 6 is a right hand elevational view partially in broken away section of the device illustrated in FIGURE 2 of the drawings, supplemented by the dotted line illustrations of the retracted and intermediate positions of the magnetic belt tightener.
FIGURE 7 is a side elevational view partially in section of the improved carriage and lead screw follower for supporting the magnetic transducer head and for moving the transducer head laterally with respect to the magnetic belt and taken along line 7—7 of the FIGURE 1.

As is clearly illustrated in the broken away section of FIGURE 6 of the drawings, the pivot end of the arm 23 is provided with a cam 25 having notches 26 and 27 in the face thereof for engagement with a cam follower 28 carried by a pivoted spring biased cam follower arm 29, whereby to enable the retention of the belt tightener 13 in either the intermediate or retracted position respectively. When the belt tightener has been pivoted into operative position as illustrated in FIGURE 6 of the drawings, the cam follower 28 permits the weight of the belt tightener 13 to be exerted against the belt 7.

The belt tightener 13 is composed of a tubular sleeve 30 supported at each end upon shaft element 31 in substantial co-axial alignment therewith by opposed resilient sponge rubber or like bushing elements snugly telescoped into the opposite ends of the tube 30 and each in turn snugly telescoped over a separate and complimentary rigid bushing 33 carried by the shaft 31 and secured therto by any suitable means or in any suitable manner. Each of the bushings 33 is provided at its outer end with an annular, closly fitted collar 34 which is provided with a circumferential flange extending radially slightly beyond the outer periphery of the sleeve 30 in close proximity to the adjacent end of the sleeve 30 thereby to limit the axial motion of the sleeve 30 upon the sponge rubber bushings 32, and to provide motion limiting or guide shoulders for the adjacent edges of the magnetic belt 7.

In the normal operation of a device according to this invention, the perforations 20, in the left hand margin of the belt 7, which is preferably made of a suitable flexible plastic sheet appropriately coated on the outer surface with magnetizable material such as iron oxide, may tend to become slightly worn, and in some instances the belt may, due to wear, imperfections in manufacture, or the effects of weather be or become slightly distorted so that one or the other of the marginal edges or intermediate portions are slightly larger than adjacent portions.

Such imperfection may, if the belt tightener 13 were not of the self aligning type, tend to cause the belt to creep slightly laterally, thereby producing disalignment between the magnetic transducer head when used as a reproducer and the helical recorded magnetic signal track in the belt 7. Similarly, when the device is used as a recorder those imperfections in the belt 7 in the absence of the improved belt tightener 13 would tend to recause the imposing of an imperfect helical path of recorded magnetic signals upon the belt 7 thereby making it difficult to obtain satisfactory reproduction of signals upon the ultimate attempt to reproduce such signals upon the same device or similar devices. Such difficulties are obviated by the use of the described improved belt tightener 13 wherein the relatively soft resilient cushioning of the tightener sleeve 30 upon the sponge rubber or like bushings 32 will permit the sleeve 30 to automatically adjust itself angularly with respect to the parallel axis of the drive roll 6 and the tightener shaft 31, thereby to accomplish the uniform tensioning of the belt 7 while the device is in operation.

As viewed in FIGURE 2 of the drawings, the upper portion of the belt 7, when in so-called forward motion, travels from the drive roll 6 toward the tightener 13. In a satisfactorily designed unit the belt may be of a width of approximately four inches and of an over-all length in loop form of approximately nine inches. The length of the material from which the belt is formed is therefore approximately eighteen inches long. The belt 7, in normal operation is preferably driven at a linear speed of approximately three and nine one-hundredths inches per second which constitutes a rotary speed of approximately eleven r.p.m.

The magnetic transducer head is so constructed and arranged, and when in operation, is so supported and moved that when the device is used as a recorder the belt 7 travels in close proximity to the magnetic element of the transducer head. A helical track of magnetic signals of a width of approximately fourteen one-thousandths of an inch is recorded upon the magnetizable medium of the belt 7 with each convolution of the helical path spaced approximately one thirty-second of an inch from the adjacent convolution thereof. By utilizing approximately three and one-half inches of the surface of the belt 7 for such recording under the foregoing described operative conditions the magnetic transducer head will traverse the belt 7 laterally thereof in approximately eleven minutes.

The magnetic transducer head 12 is pivotally supported upon a carriage 11. The carriage 11 is in turn reciprocably carried upon a guide rod 10. The guide rod 10 is positioned rearwardly and slightly upwardly from the drive roll 6 as viewed in FIGURE 6 of the drawings. The rod 10 is anchored at its opposite ends to the frame 5 and panel 4 and extends through an opening in the frame 2. The carriage 11 is prevented from rotating upon the rod 10 by a lead screw follower 37 which extends downwardly and rearwardly as viewed in FIGURE 7 of the drawings into engagement with a suitably threaded lead screw 9. Lead screw 9 is reciprocably supported at its right end as viewed in FIGURE 1 of the drawings in a journal 39 formed in the frame 5 and is reciprocably supported adjacent its left end as viewed in FIGURE 1 of the drawings by a suitable journal (not shown) in the vertical frame 2. Upon the appropriate engagement of the lead screw follower 37 with the threads of the lead screw 9 the carriage 11 and the associated transducer head 12 will, upon rotation of the lead screw 9 be caused to move laterally with respect to the drive roll 6 and the belt 7.

For driving the drive roll 6 and the lead screw 9 there is provided a power unit such, as for example, a self starting synchronous type electric motor or a shaded pole induction type electric motor 8, having a friction type drive shaft 41. When the drive roll 6 is to be driven forwardly, an idler friction wheel 42 is brought into driving engagement with the shaft 41, and the idler friction hub 43 of the wheel 42 is brought into driving engagement with a friction wheel 44 keyed to, and supported upon, shaft 16 of the drive roll 6 intermediate the frame element 2 and the bracket 19.

The friction shaft 41 and the friction wheel 44 are in fixed position. The friction wheel 42 and the associate friction hub 43 thereof are pivoted to a slide plate 45. Slide plate 45 is slidably supported by hangers 46 and 47 upon the panel 4 in such a fashion that the wheel 42 and hub 43 may be moved toward and away from the shaft 41 and moved toward and away from the wheel 44, by moving either laterally or vertically or a combination of both such motions with respect to the axis of the shaft 41 and wheel 44 and with respect to panel 4. Such motion of the idler wheel 42 and of hub 43 into engagement respectively with the shaft 41 and friction wheel 44 is accomplished by the movement of the slide plate 45 generally from left to right by the action of the tension spring 48, one end of which is secured to the slide plate 45 and the other end of which is secured to the panel 4 as viewed in FIGURE 4 of the drawings. Normally the idler wheel 42 and hub 43 are held out of driving engagement with the shaft 41 and wheel 44 by the engagement of flange 49 of the spring biased solenoid armature 50 with a shoulder 51 on the slide plate 45. Such engagement urges the slide plate 45 leftwardly as viewed in FIGURES 4 and 5 of the drawings, by virtue of the fact that the compression spring 52, telescoped over the armature 50 and compressed between the solenoid 53 which is fixed to the panel 4, and the armature flange 49, overcomes the tension of the tension spring 48, thereby withdrawing the idler wheel 42 into a neutral position and out of engagement with the shaft 41 and wheel 44. Upon the energizing of the solenoid 53 in a manner hereafter to be described, the armature 50 is drawn into the solenoid 53 thereby moving the flange 49 rightwardly as viewed in FIGURE 4 of the drawings whereupon the tension of the spring 48 will move the slide plate rightwardly as viewed in FIGURES 4 and 5 of the drawings thereby to engage the idler wheel 42 and to engage the idler hub 43 with the shaft 41 and wheel 44 respectively. Upon the de-energizing of the solenoid 53 the compression spring 52 will again operate in the manner described to move the slide plate and associated idler wheel 42 and hub 53 into a neutral position with respect to shaft 41 and wheel 44. It should be noted that the slide plate 45 is mounted on one side of the panel 4 by hangers 46 and 47 and the idler wheel 42 and associated hub 43 are supported on the opposite side of the panel 4 by a suitable pivot spindle which extends through an opening in panel 4. That spindle also functions as the hanger 47.

Figures 3, 8:
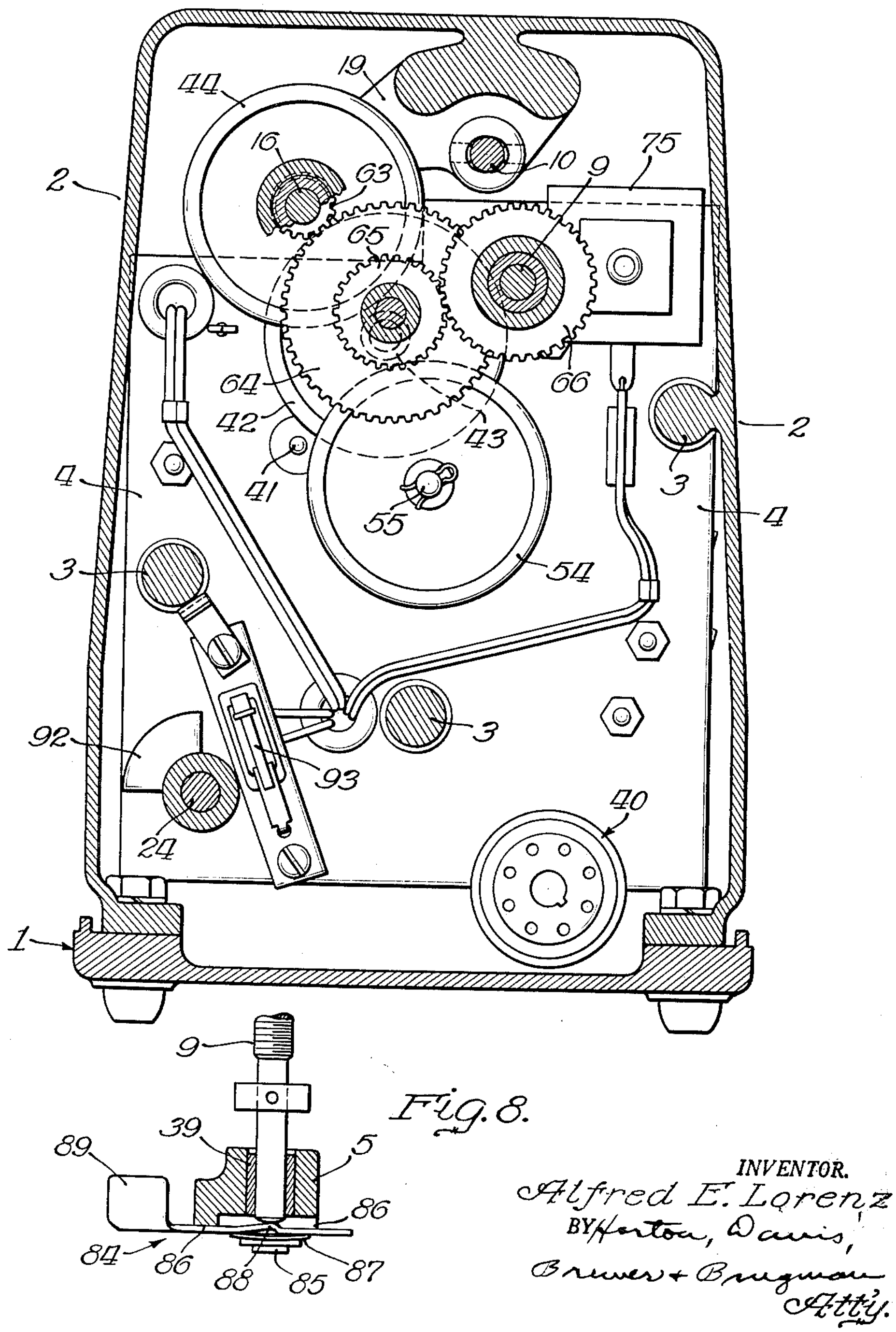
FIGURE 3 is a vertical sectional view taken along the line 3—3 of FIGURE 2 of the drawings and illustrates the arrangement of friction wheels in the improved drive arrangement in neutral position.
FIGURE 8 is a sectional view taken along line 8—8 of FIGURE 6 of the drawings illustrating the improved arrangement for enabling the establishment and easy maintenance of alignment between the magnetic transducer head and a helical path of recorded magnetic signals on the magnetic belt.

To rotate the roll 6 and associated friction wheel 44 and shaft 16 in a reverse manner the idler friction wheel 54 is brought into engagement with the power shaft 41 and with the idler friction hub 43 by swinging the wheel 54 substantially in an arc upwardly and leftwardly, as viewed in FIGURE 3 of the drawings, into engagement with the shaft 41 and then while continuing slightly its upward motion and while engaging the shaft 41, wheel 54 is moved further upwardly and slightly rightwardly. As viewed in FIGURE 3 of the drawings, wheel 54 engages with the hub 43, and such movement of the idler 54 upwardly and circumferentially of the shaft 41 is continued until the hub 43 is moved generally upwardly and slightly leftwardly, as viewed in FIGURE 3 of the drawings, into driving engagement with drive wheel 44.

Figure 4:
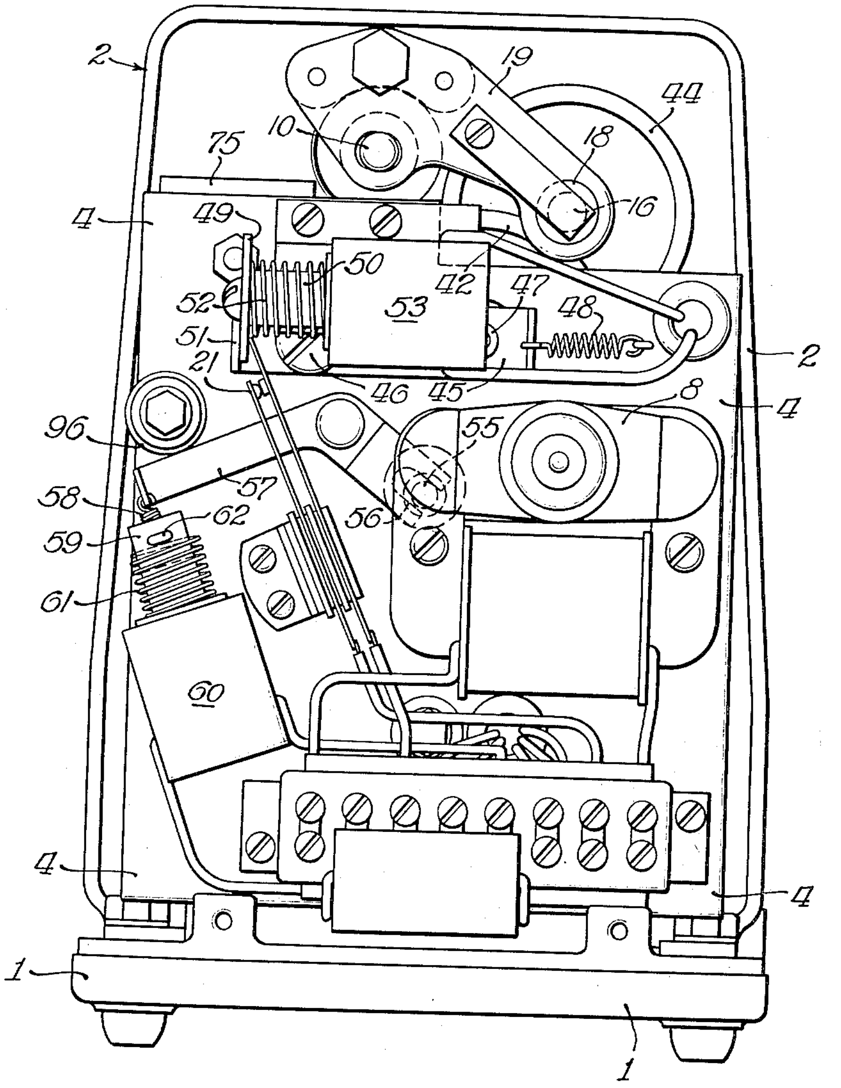
FIGURE 4 is a left end elevational view of FIGURE 2 of the drawings; showing the neutral position of the solenoids used to engage the drive wheels.

The reverse idler wheel 54 is pivoted to a spindle 55 which extends through an opening in panel 4. The spindle 55 is readily movable radially in the opening in panel 4, but axial motion thereof is prevented by use of elements such as washers of a diameter larger than the opening in panel 4 whereby to permit the radial motion but to prevent axial motion of spindle 55. Spindle 55 is slidably engaged in the slot 56 formed in the right hand depending arm of a lever 57, pivoted at substantially its mid point to the panel 4. The slot 56 is slightly out of alignment with the longitudinal axis of the depending slotted arm of lever 57. The opposite end of the pivot lever 57 is resiliently attached by spring 58 to the end of armature 59 of solenoid 60. The armature 59 is arranged to be movable in a direction substantially perpendicular to the longitudinal axis of the portion of the angular lever 57 to which it is attached and is normally held in its retracted position by compression spring 61 telescoped over the armature 59 intermediate to solenoid 60 and spring retainer key 62. In the position as is illustrated in FIGURE 4 of the drawings the reverse idler wheel 54 is in neutral position, and out of contact with shaft 41 and hub 43. Upon the energizing of the solenoid 60 the armature 59 is drawn downwardly into solenoid 60 thereby compressing spring 61 and tensioning spring 58 and pivoting lever 57 in a counter clockwise direction, as viewed in FIGURE 4 of the drawings, thereby moving the reverse idler wheel 54 into engagement with the drive shaft 41 and hub 43. The continuing general upward movement of wheel 54 moves the hub 43 into engagement with the wheel 44 as above described, thereby making possible the reverse operation of the shaft 16 and associated wheel 44 and drive roll 6. Upon the de-energizing of the solenoid 60, the resultant expansion of the compression spring 61 pivots the lever 57 in a clockwise direction, as viewed in FIGURE 4 of the drawings, thereby disengaging the wheel 54 from the shaft 41 and from the hub 43 which permits the hub 43 to drop or be drawn away from the wheel 44 into neutral position.

The lead screw 9 for accomplishing the relative lateral motion of the transducer head 12 with respect to the roll 6 and belt 7 is simultaneously driven with the roll 6 by the motor 8 through a train of spur gears drivingly connecting the shaft 16 of the drive roll 6 to the lead screw 9. To accomplish such operative connection, a spur wheel 63 is keyed to the shaft 16 adjacent to the friction wheel 44. The spur wheel 63 meshes with an idler spur wheel 64 suitably pivoted to the adjacent surface of the vertical frame 2. Spur wheel 64 is co-axially joined to a similarly positioned idler spur wheel 65 which meshes with a spur gear 66 carried by and keyed to the lead screw 9. Such a train of gears serves to transmit rotary motion from the shaft 16 to the lead screw 9 thereby esablishing a predetermined ratio and definite synchronism in the relative direction and r.p.m. of rotation of shaft 16 and lead screw 9. The relative size and number of teeth on each spur gear, and the number of gears in the train of gears, is selected in such a fashion as to produce the desired synchronism, relative speeds, and desired direction of rotation as between the shaft 16 and lead screw 9. Similarly the relative sizes of the friction shaft 41 and the friction wheels 42, hub 43, wheel 44 and wheel 54, have all been so selected as to enable the rotation of the shaft 16 and drive roll 6 in the desired direction and at the desired r.p.m. with respect to the direction of rotation and r.p.m. of the shaft 41 of the motor 8.

As hereinbefore mentioned the transducer head 12 is supported upon the carriage 11 which in turn is supported on guide rod 10. The carriage 11, as illustrated in FIGURES 1 and 7 of the drawings, is formed primarily of a tube-like element 94 which is combined with an apertured casting 95 telescoped over and secured to the tubular element 94. The tubular element 94 is telescoped over the carriage support rod 10. The tubular element 94 has such a bore that it is freely reciprocable upon rod 10 intermediate the supports therefor. To establish and maintain substantially accurate co-axial arrangement between the tube 94 of carriage 11 and the shaft 10, and to reduce to a minimum the sliding friction between the tube 94 and the shaft 10, tube 94 is provided adjacent each end thereof with three radial apertures equally spaced circumferentially thereof. Into two of these apertures adjacent each end of the tube 94, there are fitted steel balls 68 of suitable size to act as bearings and spacers between the adjacent surfaces of the tube 94 and the rod 10. These bearings and spacers 68, extend into the bore of tube 94 a distance sufficient to contact rod 10. Into the remaining two apertures, one at each end of tube 94, there are threaded set screws 69 having spherical or rounded inner ends to engage the adjacent surface of the rod 10. By this arrangement the tube 94 is reciprocably supported by a six point, minimum friction contact upon the guide rod 10, and as wear may develop as the device is used, accurate or substantially accurate axial alignment between the tube 94 and rod 10 may be satisfactorily re-established by adjustment of the set screws 69.

As viewed in FIGURE 7 of the drawings, the transducer head 12 is secured to one end of a pivotably supported arm 70 which over-lies the carriage 11 and which is pivoted by pivot pin 71 to a peripheral flange 72 of the ported casting 95 of the carriage 11. Flange 72 is on the side of casting 95 opposite the drive roll 6. When the device is in normal operation the unbalanced weight of the transducer head 12 and arm 70 cause the head 12 to rest lightly upon the belt 7 laced over the drive roll 6. In the illustrated arrangement of this invention the arm 70 extends through a slot 73 in a partition member 74 positioned intermediate the drive roll 6 and the carriage 11.

The timed reciprocating movement of the carriage 11 upon the rod 10 is accomplished by means of a lead screw follower 37 extending downwardly and slightly toward the right from tube 94, as viewed in FIGURE 7 of the drawings, into close proximity to the left side of the lead screw 9 which is positioned below and to the right of the carriage support rod 10. The arm 37 forms part of the casting 95 and is provided with a relatively broad flat surface 76 adjacent the screw threads on the lead screw 9.

The flat surface 76 is appreciably broader than the distance between adjacent screw threads on the lead screw 9, which distance in the illustrated embodiment of the invention is in the form of a thirty-two pitch screw, wherein the distance between adjacent screw threads is one thirty-second of an inch. Extending to the right of arm 37, as viewed in FIGURE 7 of the drawings, and overlying the lead screw 9 and extending downwardly along the right hand side of the lead screw 9, is a knife edge screw thread follower 77 carried by arm 37, and spaced from the flat surface 76 on arm 37 a distance slightly greater than the over-all diameter of the lead screw 9. The follower 77 is adapted to engage the threads of the lead screw 9 only on the side of the lead screw opposite the flat surface 76 of screw follower arm 37.

To aid in maintaining the knife edge screw thread follower 77 in engagement with the screw threads of lead screw 9 there is provided a cantilever arm 78 extending from follower arm 37 rightwardly, as viewed in FIGURE 7 of the drawings, and overlying the lead screw 9 and follower 77 and extending rightwardly there beyond. The free end of arm 78 is threaded to receive a weight element 97 adjustably threaded thereonto. The suitable adjustment of the weight 97 upon the arm 78 functions to aid in maintaining satisfactory engagement between the follower 77 and the lead screw 9.

The arm 78 also functions as an actuator for a signal bell positioned on frame 2 adjacent the normal end of the travel of the carriage 11 during use of the device for rcording or reproducing operations.

As illustrated in FIGURE 7 of the drawings, some of the unbalanced weight of the transducer head 12 and head support arm 70, when the head 12 is in illustrated operative position, will also tend to pivot the carriage 11 on shaft 10 in a clockwise direction thereby also aiding in urging the knife edge screw thread follower 77 into engagement with screw threads of lead screw 9. In such arrangement the carriage 11 may be reciprocated upon the rod 10 by appropriate rotation of the lead screw 9.

In the event it is desired to so reciprocate the carriage 11 and head 12 manually, it is only necessary to slightly raise the transducer head 12 whereupon a spring clip 79, extending downwardly from the mid underside of the arm 70, will be caused to override and lockingly engage a detent 80, on the left side of the carriage tube 94, as viewed in FIGURE 7 of the drawings. Upon thereafter releasing the upward thrust on the head 12, the spring clip 79 remains engaged with the detent 80 and the unbalanced weight of the head 12 will tend to pivot the carriage 11 on guide rod 10 until the flat surface 76 on screw follower arm 37 engages the lead screw 9. When such engagement has been accomplished the follower 77 is disengaged from the lead screw 9 and the head 12 is out of contact with the drive roll 6 and belt 7 and may be freely reciprocated manually upon rod 10. To re-engage the knife edge screw follower 77 with the lead screw 9 and to replace the head 12 into operative position, it is only necessary to press downwardly upon head 12 sufficiently to disengage detent spring 79 from detent 80, thereby permitting the unbalanced weight 97 to partially rotate carriage 11 until follower 77 again engages screw 9.

In the operation of the improved device it is sometimes found that the sensitive magnetic element of the transducer head 12 is not properly aligned with the track of recorded magnetic signals on the belt 7. Such a condition may develop when a belt 7 is removed from one device used as a recorder and placed on another device used as a reproducer. In the present invention it is contemplated that such recorded tracks of magnetic signals will be approximately fourteen one-thousandths of an inch in width, and that in keeping with the pitch of the lead screw 9, the centers of such tracks will be spaced one from another by approximately one thirty-second of an inch. Accurate alignment of the transducer head 12 and the helical path of recorded magnetic signals in the belt 7 is necessary to secure good reproduction of signals. To enable such accurate alignment of the head 12 and the helical track of recorded magnetic signals in belt 7 this invention provides a novel means for axially adjusting the position of the lead screw 9 by any suitable distance which may if desired be slightly in excess of the spacing between adjacent convolutions of the screw threads on the lead screw 9. Such axial adjustment of the lead screw 9 will automatically accomplish a comparable reciprocation and lateral adjustment of the carriage 11 and the transducer head 12. The lead screw 9 is made thus reciprocable by mounting the ends thereof in journals permitting such necessary axial adjustment as hereinbefore described. As viewed in FIGURE 1 of the drawings, a collar 81 is secured to the lead screw 9 adjacent and to the right of the frame element 2. A compression coil spring 82 is telescoped on the shank of the lead screw 9 intermediate to collar 81 and the frame 2, to thereby urge the lead screw 9 to the right until the hub 83 of the spur gear 66 engages the frame 2, thereby limiting the axial motion of the lead screw 9 toward the right. To move the lead screw axially to the left, as viewed in FIGURE 8 of the drawings, there is provided a substantially circular, rotary cam element 84 pivoted by screw 85 to the frame 5 adjacent the right hand end of the lead screw 9, the end of which lead screw extends slightly beyond the adjacent right hand surface of the frame 5. The substantially disc-like element 84 is provided with a substantially flat apertured central portion and is pressed against a bearing shoulder 86 on frame 5 by the combined action of the tightening of the pivot screw 85 and a compressed spring washer 87 intermediate the head of the screw 85 and the adjacent surface of the cam element 84. A cam surface 88 is provided on element 84 at such a position as to overlie the adjacent end lead screw 9. Cam surface 88 is of varying height measured perpendicularly to the plane of element 84 and extends in a circumferential direction on element 84. The pivot screw 85 is so fashioned, and the dimensions of the cam element 84 are such, that the cam surface 88 engages the adjacent end of the lead screw 9. As the cam element 84 is pivoted upon the pivot screw 85 the cam surface 88 is maintained in engagement with the adjacent end of the lead screw 9 by the compressive thrust of the spring 82 which causes the lead screw 9 to reciprocate axially as the cam element 84 is pivoted clockwise or counter clockwise upon the pivot screw 85. To enable the easy pivoting of the cam element 84 there is provided a peripheral manually engageable pressure plate 89. To limit the extent of the pivotal motion of the cam element 84, a portion of the peripheral edge of the element 84 is slotted at 90, and a key 91 secured to the frame 5 extends into the slot. It should of course be noted that the meshing spur gears 65 and 66 must be of such a width as to accommodate the reciprocation motion of the spur gear 66 incidental to the reciprocation of the lead screw 9.

The adjustment device 84 which may be referred to as a tuner may be most conveniently used during reproduction operations by easily pivoting the element 84 until the head 12 is properly aligned with the magnetic record track which becomes evident when reproduction signals are clearest.

In the operation of the improved device, after the electrical circuits have been connected to a source of power in a manner hereinafter to be described, the belt tightener 13 is lowered to the full line position illustrated in FIGURE 6 of the drawings, drawing taut the belt 7 and rotating the pivot 24 of the belt tightener arm 23 thereby rotating the cam 92 secured to pivot 24 and closing the spring switch 93 to energize the electrical circuits of the device, including the motor 8. Upon the closing of the circuit for the drive mechanism for forward drive by the use of the switches provided on the microphone or foot switches used in connection with the improved device, the solenoid 53 is energized and the friction wheel 42 and hub 43 are moved into forward drive position as hereinbefore described. Simultaneously the flange 49 on the armature 50 which causes the movement of the support for the wheel 42 and hub 43 engages the mute switch mechanism 21 opening the dictating circuit of the improved device. Upon the de-energizing of the solenoid 53 the flange 49 again moves to its neutral position as hereinbefore described, disengaging the mute switch 21, thereby muting the audio circuit of the device. The recording and transcription circuits of the device are only operative while the device is in forward operation.

Figure 11:
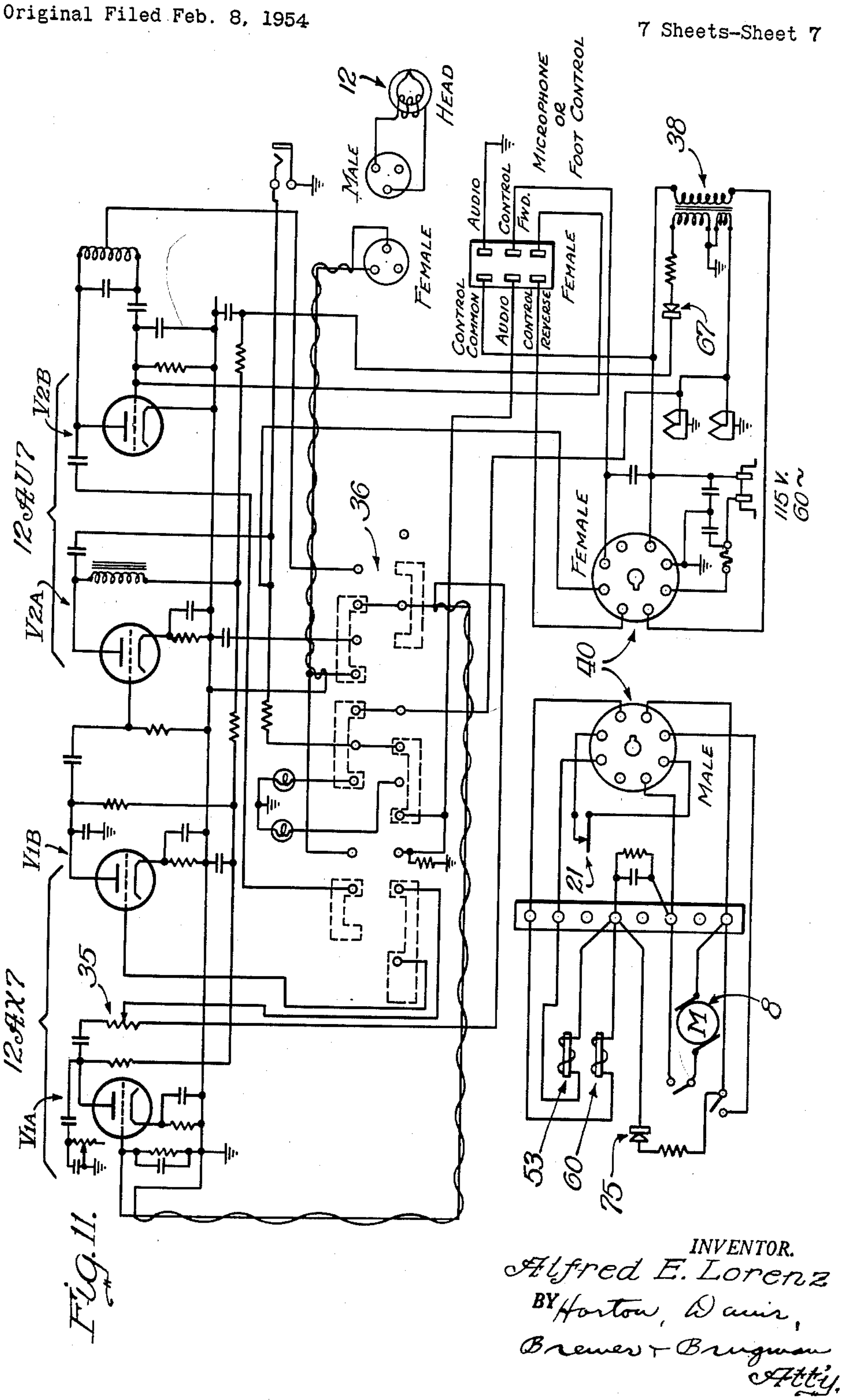
FIGURE 11 is a wiring diagram of the utilized electrical instrumentalities in the improved apparatus.

As is clearly illustrated in FIGURE 2 of the drawings the device is provided with two manually adjustable elements 35 and 36 which are respectively, a volume control and a multiple switch, both of the rotary type, and constitute part of the circuit illustrated in FIGURE 11 of the drawings. Element 35 is usable to control the volume of reproduction of the magnetic signals and element 36 is usable to convert the device from a recording to a reproducing device or vice versa.

In the circuit diagram the switch 36 is shown in the transcribing or reproducing position. By moving the swingers of the rotary switch element 36 one position to the right, as viewed in FIGURE 11 of the drawings, the device is converted to a dictating or recording device. The audio and amplifying circuits employ the conventional type of receiving tubes commonly designated as 12AX7 and 12AU7 and a magnetic recording and reproducing head 12. The elements of the circuit illustrated in FIGURE 11 of the drawings are in large part self explanatory. The audio circuit includes the power transformer 38, and selenium rectifier 67. The audio circuit and the drive circuit are connected by the octal socket 40 as illustrated in FIGURE 11. The motor circuit diagram, as illustrated, includes the mute switch 21, the solenoids 53 and 60, the selenium rectifier 75 and the drive motor 8.

From the foregoing description of the improved transducer or recording and reproducing apparatus, it will be apparent that this invention provides improved reversible drive apparatus, improved recording medium belt support and tightening arrangements, an improved combination of apparatus for causing the transverse movements of the recording and reproducing head with respect to the magnetic belt, as well as providing a unique device for adjusting the axial position of the lead screw used for actuating the recording and reproducing head laterally with respect to the belt type of recording medium thereby to enable the satisfactory alignment of the transducer head with a selected path of recorded magnetic signals on the recording medium belt.

Having thus described and illustrated the preferred embodiment of this invention in a transducer or recording and reproducing device, the invention is not to be interpreted as being restricted to the specifically illustrated preferred embodiments thereof, as set forth in the drawings and as hereinbefore described, except insofar as is necessitated by the disclosure of the prior art and the appended claims.

I claim:

1. A reversible power transmission device, comprising, in combination, a driven wheel, a drive wheel spaced from said driven wheel and lying in the same plane therewith, said drive wheel rotating in a single direction, co-axial idler wheels of different diameters journalled on a spindle and rotatable as a unit in said plane and spaced from said driven wheel and spaced from said drive wheel, support means for said spindle shiftable transversely with respect to the axis of said driven wheel and with respect to the axis of said drive wheel, means for shifting said support from a normal inactive position to an active position to bring said co-axial idler wheels into frictional driving engagement with said driven wheel and with said drive wheel for rotating said driven wheel in a predetermined direction as determined by the direction of rotation of said drive wheel, a pivoted idler wheel shiftably supported in said plane, means for shifting said co-axial wheels and said pivoted idler wheel together to a second active position in which said co-axial idler wheels are out of engagement with said drive wheel but in engagement with said driven wheel, and said pivoted idler wheel is in engagement with said co-axial idler wheels and said drive wheel, whereby to enable the selection of the direction of rotation of the driven wheel.

2. In a drive mechanism, a fixed position driven wheel, a fixed position drive wheel spaced from said driven wheel, shiftable motion transmission means for movement into operative position intermediate said drive wheel and said driven wheel, shiftable support means for said motion transmission means slidably supported at one end thereof and supported by first spring means at the opposite end thereof, said first spring means urging said support means in direction for engaging said motion transmission means operatively with said drive wheel and with said driven wheel, second spring means urging said support means in the opposite direction and overcoming the effect of said first spring means, and electro magnetic means for overcoming the effect of said second spring means, whereby upon the energizing of said electro magnetic means said first spring means will move said support means in such a fashion as to engage said motion transmission means with said drive wheel and with said driven wheel.

3. In a machine of the character disclosed, a rotatable roll mounted for supporting a record member in the form of a belt, a wheel on the roll, a motor having a drive shaft, an idler wheel having two co-axial friction surfaces of different diameters, means mounting the idler wheel for movement into and out of a position in which one surface engages the drive shaft and the other surface engages the wheel on the roll for transmitting drive therebetween, the mounting means providing limited universal movement in a plane perpendicular to the axes of the drive shaft and wheel on the roll whereby it is held firmly in engagement with the drive shaft and the wheel on the roll in response to a force acting in a direction generally transverse to a line interconnecting the axes of the drive shaft and wheel on the roll, means biasing the idler wheel out of said position, and electro-magnetically controlled means for moving it into said position.

4. In a magnetic recording and reproducing machine having a transducer and adapted for use with a magnetic record member, a drive roll having a fixed location and provided with a tightener roll for mounting a belt record member, projections on the drive roll for engaging in apertures in the record member for positively driving the latter, a wheel on the drive roll, a constantly rotating unidirectional motor having a fixed location and provided with a drive shaft, friction wheel means having elements movable into and out of drive transmitting engagement with the drive shaft and wheel on the drive roll for transmitting drive to the drive roll in a forward direction at a relatively slow speed and a reverse direction at a relatively fast speed, manually controlled means for moving certain of said friction wheel elements into said engagement for transmitting forward drive to the drive roll, and manually controlled means for moving certain of said friction wheel elements into said engagement for transmitting reverse drive to the drive roll.

5. In a magnetic recording and reproducing machine a drive roll having a fixed location and a tightener roll for mounting a belt record member, projections on the drive roll for engaging in apertures in the record member for positively driving the latter, a transducer head movable into and out of transducing position relative to the record member when the latter is mounted on said drive roll and tightener roll, the transducer head being also movable transversely of the record member in the direction of the axis of the drive roll, means interconnecting the drive roll and transducer head when the transducer head is in transducing position for so moving the latter transversely in response to rotation of the drive roll in each of opposite directions corresponding to respective directions of rotation of the drive roll, the transducer head being manually so movable transversely when out of said transducing position, a wheel on the drive roll, a constantly rotating unidirectional motor having a fixed location and provided with a drive shaft, friction wheel means having elements movable into and out of drive transmitting engagement with the drive shaft and wheel on the drive roll for transmitting drive to the drive roll in each a forward and a reverse direction, manually controlled means for moving certain of said friction wheel elements into said engagement for transmitting forward drive to the drive roll, and manually controlled means for moving certain of said friction wheel elements into said engagement for transmitting reverse drive to the drive roll.

6. In a device of the character disclosed, a drive shaft, a driven wheel, a first idler wheel with a peripheral friction surface and having a hub with a small diameter friction surface co-axial therewith, means mounting the first idler wheel for movement into and out of position in which the peripheral friction surface engages the drive shaft and the hub friction surface engages the driven wheel, a second idler wheel with a peripheral friction surface movable into and out of position in which its peripheral friction surface engages the drive shaft and the hub on the first idler wheel, the second idler wheel in moving into its said position being capable of moving the first idler wheel so that the said hub thereof engages the driven wheel and the first idler wheel is out of engagement with the drive shaft, and means for selectively moving the idler wheels into their respective said positions.

7. In a device of the character disclosed, a frame, a driven wheel, a drive shaft, a first idler wheel, means mounting the first idler wheel including a plate mounted at one end on the frame for pivotal movement and for translational sliding movement in a longitudinal direction, the first idler wheel being mounted in the plate at an end opposite said one end and movable in response to the longitudinal movement of the plate in directions generally transverse to a line interconnecting the axes of the drive shaft and driven wheel into and out of an operative position in which it engages the drive shaft and driven wheel, means biasing the first idler wheel to an inoperative position in which it is capable of limited swinging movement about the axis of the said one end of the plate into a second position in engagement with the driven wheel but out of engagement with the drive shaft, a second idler wheel, means mounting the second idler wheel on the frame for movement into and out of an operative position in which it engages the drive shaft and first idler wheel, said second idler wheel in moving into its said operative position moving in a line which approaches parallelism with the first line whereby it is capable of moving the first idler wheel to its said second position in bypassing relation to the drive shaft, means biasing the second idler wheel to an inoperative position, and means for selectively moving the idler wheels into their respective operative positions.

8. The invention set out in claim 7 in which the first idler wheel has a peripheral friction surface engageable with the drive shaft and a hub with a friction surface engageable with the driven wheel, and the second idler wheel has a peripheral friction surface engageable with both the drive shaft and the hub of the first idler wheel.

9. In apparatus of the character disclosed, means for mounting a belt forming a magnetic record medium for movement in a linear path, a magnetic transducer having a transducing position and movable transversely of the record medium for tracing a helical path thereon, means interconnecting the belt mounting means and transducer for conjoint movement, the belt mounting means and transducer being movable together in each a forward and a reverse direction, driving means, drive transmitting means operatively interposed between the drive means and belt mounting means including a drive wheel on the driving means and a driven wheel on the belt mounting means, a first idler wheel having relatively large and small diameter friction surfaces and movable into and out of a first position in which the large diameter friction surface engages the drive wheel and the small diameter friction surface engages the driven wheel, and movable into a second position in which its small diameter friction surface engages the driven wheel, manually controlled means for so moving said first idler wheel, a second idler wheel having a friction surface and movable into and out of a position in which its said friction surface commonly engages the drive wheel and the small diameter friction surface of the first idler wheel, and being operative, in moving into its said position, for moving the first idler wheel into the latter's said second position, and manually controlled means for so moving the second idler wheel.

10. The invention set out in claim 9 in which the first idler wheel is mounted for sliding and swinging movement whereby it firmly engages the drive wheel and driven wheel in response to a single force acting generally transverse to a line connecting the axes of the drive and driven wheels.

11. The invention set out in claim 9 in which the second idler wheel is mounted for sliding and swinging movement whereby it firmly engages the drive wheel and the small diameter friction surface of the first idler wheel in response to a single force acting generally transverse to a line connecting the drive wheel and first idler wheel.

References Cited in the file of this patent

UNITED STATES PATENTS

| | | |
|---|---|---|
| 651,656 | Durr | June 12, 1900 |
| 1,806,984 | Prout | May 26, 1931 |
| 1,870,421 | Prout | Aug. 9, 1932 |
| 2,087,581 | Ross | July 20, 1937 |
| 2,371,116 | Yerkovich et al. | Mar. 6, 1945 |
| 2,504,587 | Rey | Apr. 18, 1950 |
| 2,528,061 | Knapp | Oct. 31, 1950 |
| 2,535,478 | Arndt | Dec. 26, 1950 |
| 2,606,766 | Kuhlik | Aug. 12, 1952 |
| 2,668,059 | Roberts | Feb. 2, 1954 |
| 2,672,346 | Roberts | Mar. 16, 1954 |
| 2,857,165 | Roberts | Oct. 21, 1958 |